United States Patent
Ono et al.

(10) Patent No.: US 7,522,155 B2
(45) Date of Patent: Apr. 21, 2009

(54) TRACKBALL DEVICE AND VEHICLE INCORPORATING THE SAME

(75) Inventors: Takatoshi Ono, Kyoto (JP); Takefumi Inoue, Nara (JP)

(73) Assignee: Panasonic Corporation, Osaka (JP)

( * ) Notice: Subject to any disclaimer, the term of this patent is extended or adjusted under 35 U.S.C. 154(b) by 569 days.

(21) Appl. No.: 10/757,584

(22) Filed: Jan. 15, 2004

(65) Prior Publication Data
US 2004/0164963 A1    Aug. 26, 2004

(30) Foreign Application Priority Data

| Jan. 16, 2003 | (JP) | ............................. 2003-007979 |
| Feb. 3, 2003 | (JP) | ............................. 2003-025587 |
| Mar. 31, 2003 | (JP) | ............................. 2003-094936 |

(51) Int. Cl.
   *G06F 3/033* (2006.01)
(52) U.S. Cl. .................................................... 345/167
(58) Field of Classification Search ......... 345/156–158, 345/163–167; 340/691.7
   See application file for complete search history.

(56) References Cited

U.S. PATENT DOCUMENTS

| 4,581,609 | A | * | 4/1986 | Hosogoe et al. ............. 345/167 |
| 5,168,221 | A | * | 12/1992 | Houston ...................... 345/164 |
| 5,171,978 | A | * | 12/1992 | Mimlitch et al. ............. 345/167 |
| 5,237,311 | A | * | 8/1993 | Mailey et al. ................ 345/167 |
| 5,639,168 | A | * | 6/1997 | Noguchi et al. ............. 384/492 |
| 5,831,553 | A | * | 11/1998 | Lenssen et al. ............. 345/167 |
| 5,914,705 | A | * | 6/1999 | Johnson et al. ............. 345/163 |
| 6,144,370 | A | * | 11/2000 | Eleyan et al. ................ 345/167 |
| 6,354,945 | B1 | * | 3/2002 | Furuki et al. ................ 345/161 |
| 6,509,888 | B1 | * | 1/2003 | Tuovinen et al. ............ 345/156 |
| 6,518,890 | B2 | * | 2/2003 | Hallen et al. ............. 340/691.7 |
| 6,825,831 | B1 | * | 11/2004 | Passaro ...................... 345/167 |
| 6,909,422 | B2 | * | 6/2005 | Yokoji et al. ................ 345/167 |
| 7,015,895 | B2 | * | 3/2006 | Muresane et al. ........... 345/163 |
| 2002/0054011 | A1 | * | 5/2002 | Bruneau et al. ............. 345/156 |

FOREIGN PATENT DOCUMENTS

| JP | 64-24447 | | 2/1989 |
| JP | 8-185259 | | 7/1996 |
| JP | 10-241502 | | 9/1998 |
| JP | 2000226641 A | * | 8/2000 |
| WO | 97/12357 | | 4/1997 |
| WO | 97/25657 | | 7/1997 |

* cited by examiner

*Primary Examiner*—Sumati Lefkowitz
*Assistant Examiner*—William L Boddie
(74) *Attorney, Agent, or Firm*—Wenderoth, Lind & Ponack, L.L.P.

(57) ABSTRACT

A trackball device including (i) a sphere, (ii) a support for rotatably supporting the sphere, (iii) a rotation detector for detecting rotation of the sphere, and (iv) a controller. The controller generates a specific output signal responsive to a signal from the rotation detector. The trackball device further includes an informer for generating auxiliary information that gives feedback of the situation to an operator according to how the sphere rotates. This structure can provide a trackball device having excellent user-friendliness. Because this trackball device gives feedback of the position of a pointer on a display to the operator, the operator doesn't have to look at the display. Thus, this trackball device is especially preferred for incorporation into a vehicle.

34 Claims, 14 Drawing Sheets

TRACKBALL DEVICE AND VEHICLE INCORPORATING THE SAME

FIELD OF THE INVENTION

The present invention relates to a trackball device and an input device for input operation to various kinds of electronic equipment. It is particularly suitable for applications where two-dimensional movement is necessary, such as a pointer. The present invention also relates to a vehicle incorporating the trackball device.

BACKGROUND OF THE INVENTION

Recently, vehicles have been incorporating various kinds of electronic equipment. To operate such electronic equipment, a control panel divided into areas, each corresponding to a respective piece of equipment, are disposed in the vicinity of the center of an instrument panel in front of a vehicle interior. The control panel has operation switches arranged thereon.

For some kinds of electronic equipment, semi-automatic operation using electronic components is employed rather than manual operation. Thus, more comfortable driving is provided. On the other hand, in the use of electronic equipment dealing with maps and traffic information represented by a navigation device, operations including selection and determination of information are necessary. For this reason, the number of switches that constitute the input part of these various kinds of electronic equipment may amount to more than one hundred per vehicle, including switches turned on/off on the screen of the navigation device and the like, in some cases.

Switches are concentrated in the vicinity of the center of an instrument panel because a user in the vehicle can easily operate the switches. For this reason, a designer of a vehicle cannot dispose instrumentation for displaying vehicle information freely and a user takes more time to look for the switch corresponding to a desirable function.

To address this problem, it has been proposed to dispose a multi-functional input device for operating various kinds of electronic equipment incorporated into a vehicle in a concentrated manner in a position other than an instrument panel. The Japanese Utility Model Unexamined Publication No. S64-24447 discloses that a trackball device is placed on a floor console between a driver seat and a front passenger seat and switches are placed in the vicinity of the trackball device. Input operations using the trackball device and the switches cause movement of a cursor on a screen and selection of specific processes.

However, in the use of such an input device, visual recognition of the position of a cursor or a pointer on a screen is necessary. With this structure, the user needs to stop the vehicle to operate the input device for traffic safety.

SUMMARY OF THE INVENTION

A trackball device of the present invention includes (i) a sphere, (ii) a support for rotatably supporting the sphere, (iii) a rotation detector for detecting the rotation of the sphere, and (iv) a controller. The controller generates a specific output signal responsive to the signal from the rotation detector. Further, the trackball device includes an informer for generating auxiliary information that gives feedback of the conditions to an operator according to how the sphere rotates.

DETAILED DESCRIPTION OF THE INVENTION

First Exemplary Embodiment

Figure 1:
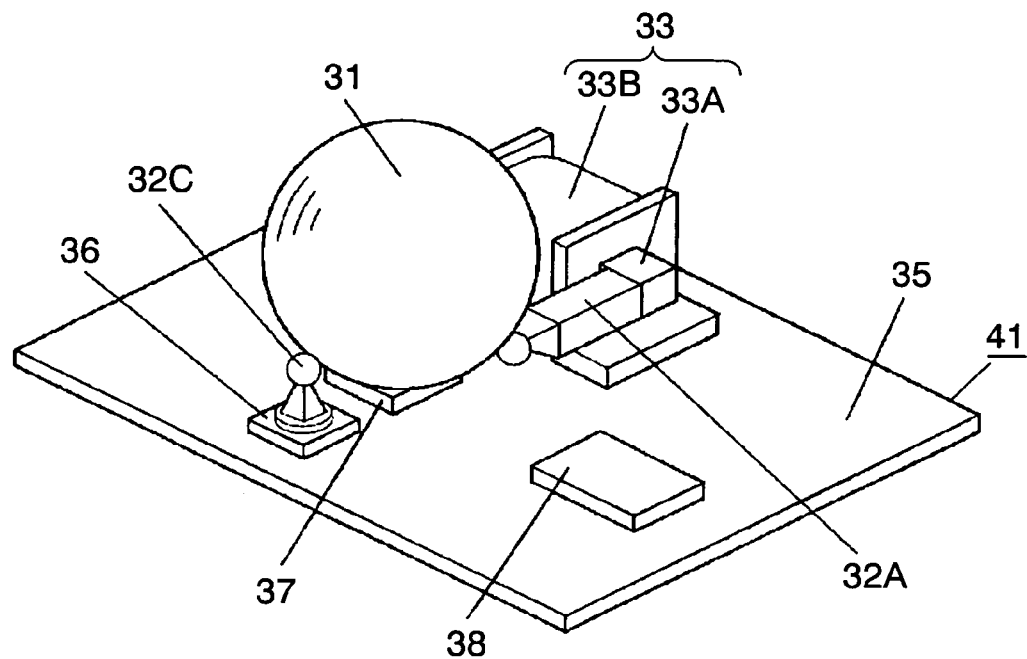
FIG. 1 is a perspective view of a trackball device in accordance with a first exemplary embodiment of the present invention.
Figure 2:
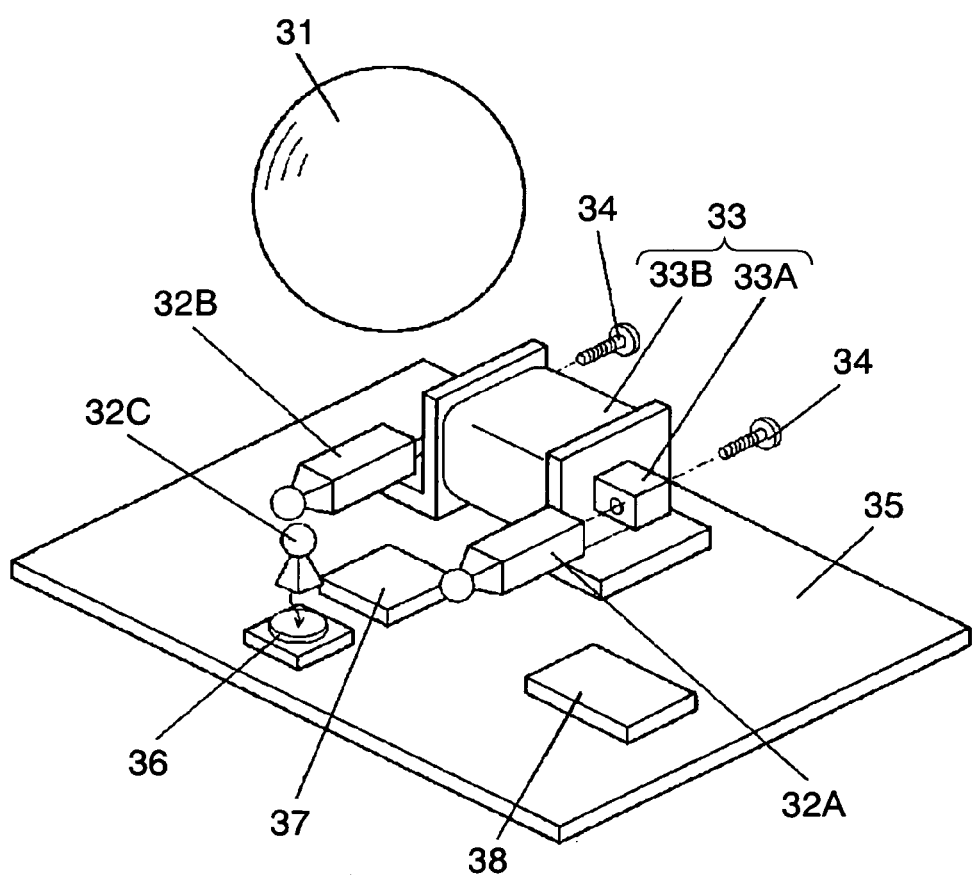
FIG. 2 is an exploded perspective view of the trackball device of FIG. 1.
Figure 3:
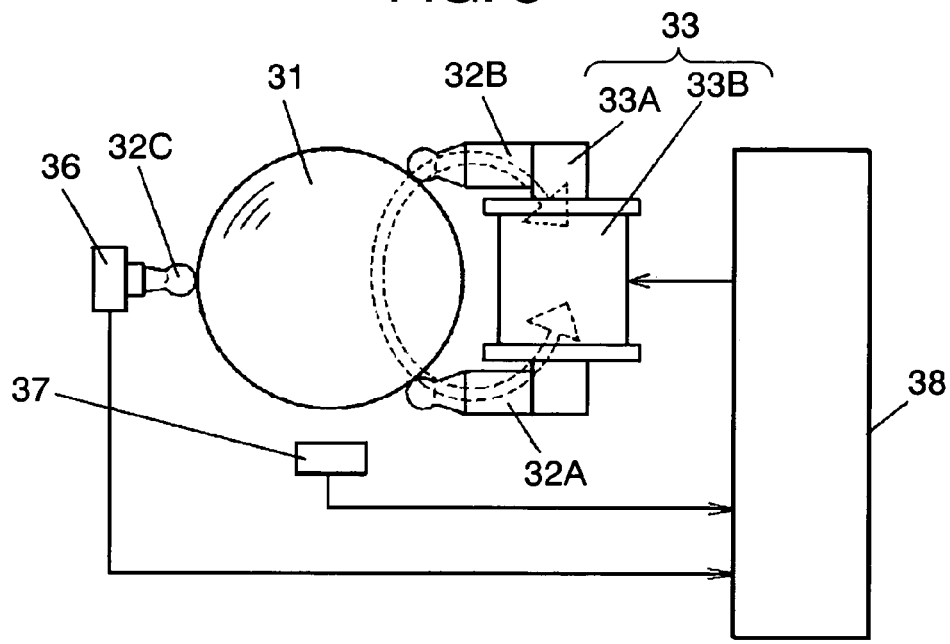
FIG. 3 is a block diagram of the trackball device of FIG. 1.

FIG. 1 is a perspective view of a trackball device in accordance with the first exemplary embodiment of the present invention. FIG. 2 is an exploded perspective view thereof. FIG. 3 is a block diagram thereof.

Sphere 31 including magnetic material, i.e. an operating member, is rotatably mounted on spherical projections in a stable manner. The spherical projections are provided at the tips of respective supporting members 32A, 32B, and 32C that form a support. Supporting member 32A, 32B, and 32C support sphere 31 at three equiangular points in a lower position of sphere 31.

Screws 34 connect and secure one end of respective supporting members 32A and 32B to both ends of rod-shaped core 33A forming electromagnet 33. Supporting members 32A and 32B, and core 33A are disposed like a rectangle lacking one edge as seen from the top, namely in a U-shape.

Electromagnet 33 is fixed to substrate 35. Leads from coil 33B of electromagnet 33 are electrically connected to a predetermined wiring part (not shown) formed on substrate 35. On the other hand, supporting member 32C is connected and fixed onto the key top of depression type switch 36 by an adhesive or the like. The terminals (not shown) of switch 36 are connected to another wiring part on substrate 35 by solder or the like. Thus, switch 36 is electrically and mechanically connected and fixed to substrate 35.

Disposed on substrate 35 under sphere 31 is rotation detector 37 for detecting how sphere 31 rotates. Rotation detector 37 is an integrated circuit for detecting rotation that includes a C-MOS image sensor. Similarly, rotation detector 37 is electrically and mechanically connected to still another wiring part (not shown) on substrate 35.

Coil 33B, switch 36, and rotation detector 37 are connected to controller 38 that is mounted on substrate 35, via a wiring pattern on substrate 35, as shown in FIG. 3. Controller 38 is a kind of microcomputer. Controller 38 controls input and output signals.

Sphere 31 is described as including magnetic material. For a metal sphere, it is desirable to use martensite stainless steel or ferrite stainless steel because they have excellent magnetic properties and rust and flaw resistance over an extended period of use.

When how sphere 31 rotates is read by rotation detector 37 including an optical image sensor as described above, it is preferable that the surface roughness of sphere 31 ranges from 3 to 50 μm. This facilitates formation of shade on the surface of sphere 31 and ensures accurate detection of rotation.

Further, it is also desirable that supporting members 32A and 32B include magnetic material. This minimizes the gap in the magnetic flux circuit formed by electromagnet 33 and sphere 31 and reduces flux leakage. Thus, the force generated during activation of electromagnet 33 effectively interferes with sphere 31.

Additionally, it is also preferable that the surfaces of sphere 31 and supporting members 32A through 32C are made of the same material. This causes wear and tear or flaws on sphere 31 and supporting members 32A through 32C in the same degree. Thus, even when sphere 31 having a rough surface is used, smooth rotation of sphere 31 tends to be maintained.

Figure 4:
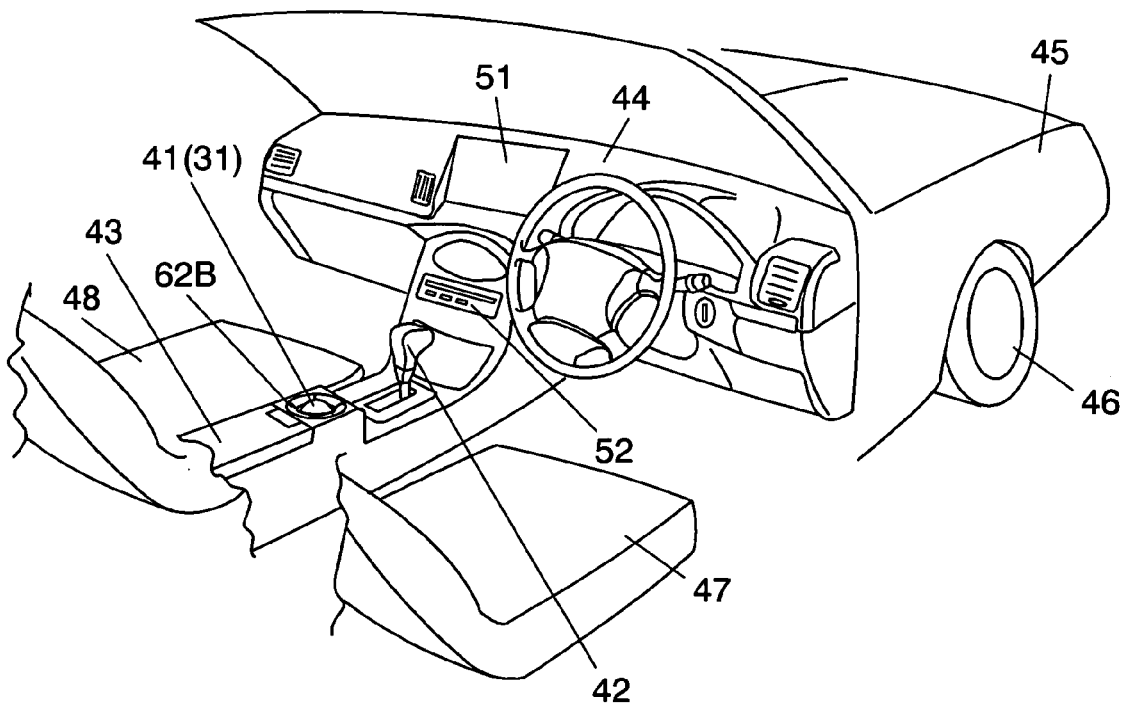
FIG. 4 is a partially exploded perspective view of a vehicle incorporating an input device that includes the trackball device in accordance with the first exemplary embodiment of the present invention.
Figure 5:
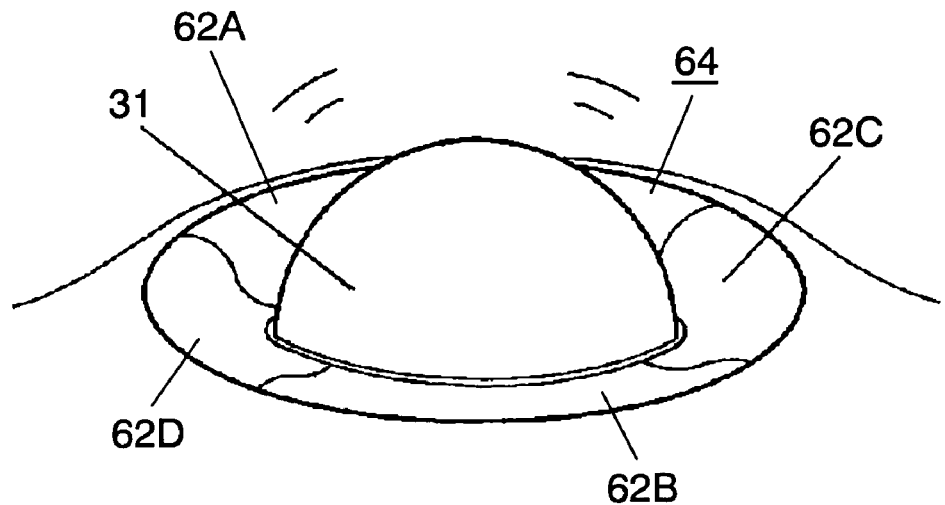
FIG. 5 is an enlarged perspective view of a periphery of the input device of FIG. 4
Figure 6:
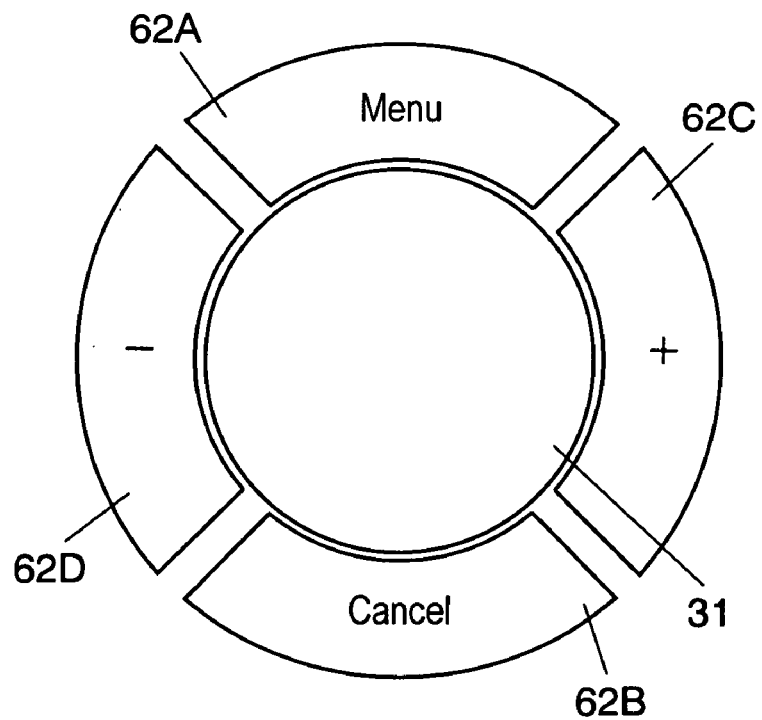
FIG. 6 is a top view of FIG. 5
Figure 7:
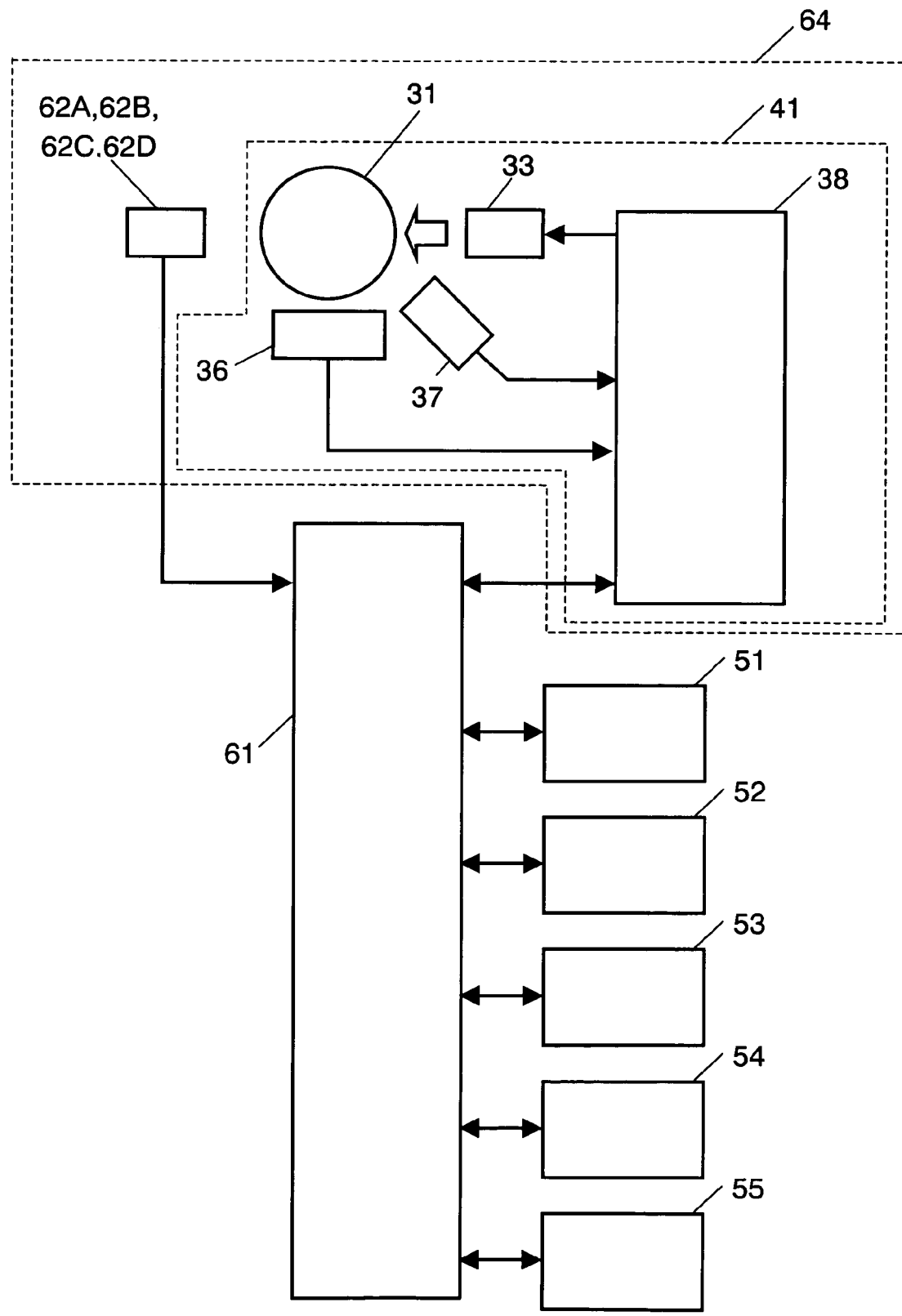
FIG. 7 is a block diagram showing a structure of an electronic equipment system of the entire vehicle incorporating the input device in accordance with the first exemplary embodiment of the present invention.

Trackball device 41 of this embodiment as structured above is incorporated into a vehicle as an input operation part of equipment incorporated into the vehicle, as shown in FIGS. 4 through 6, for use. FIG. 4 is a partially exploded perspective view of a vehicle incorporating trackball device 41. FIG. 5 is a perspective view of input device 64 including trackball device 41 that is incorporated into the vehicle. FIG. 6 is a top view thereof. FIG. 7 is a block diagram showing a structure of an electronic equipment system of the entire vehicle that incorporates input device 64 including trackball device 41.

Trackball device 41 is disposed in a position between driver seat 47 and front passenger seat 48 in the interior of vehicle body 45, as shown in FIG. 4. In general, disposed in the position between driver seat 47 and front passenger seat 48 are shift lever 42 for switching the gear ratio of a gear box and console box 43 for accommodating small articles and the like. The peripheral area of these components is referred to as a "console portion". Described in this embodiment is an example in which input device 64 including trackball device 41 is placed between shift lever 42 and console box 43 that constitute the console portion. Drive wheels 46 support vehicle body 45.

Display 51 is disposed in the central portion of instrument panel 44 in front of the vehicle cabin. Display 51 gives information to passengers. Other than display 51, sight, hearing, and the like that make passengers recognize various conditions can be used. Display 51 shows operating conditions of audio device 52, navigation device 53, air-conditioner 54, information terminal device 55, and the like. Images supplied form a TV set, camera, or other devices (not shown) can also be displayed. Audio device 52 performs selection of music or broadcaster to tune and other functions. Navigation device 53 provides road or other information. Air-conditioner 54 controls the condition of the air inside of the vehicle. Information terminal device 55 controls telephone calls and e-mails. System control unit (hereinafter referred to as a "control unit") 61 is connected to controller 38. Control unit 61 controls display 51, audio device 52, navigation device 53, air-conditioner 54, information terminal device 55, and other devices. Control unit 61 is also a microcomputer.

Trackball device 41 is disposed as an input operation part for switching the operating state of various kinds of electronic equipment incorporated into the vehicle as described above and for providing instructions to display information. As shown in FIGS. 5 and 6, push type switches (hereinafter referred to as "switches") 62A through 62D are disposed around the exposed surface of sphere 31. Switches 62A through 62D are also connected to control unit 61. Thus, trackball device 41 and switches 62A through 62D form input device 64.

Descriptions are provided of the action of an input device of this embodiment and the resulting operation of electronic equipment hereinafter with reference to FIGS. 8A through 17. FIGS. 8A through 8D are time diagrams showing signals supplied from rotation detector 37, a waveform of voltage applied to coil 33B, and a change in the force necessary for rotating sphere 31, respectively. FIGS. 9A and 9B are sectional side elevation views of trackball device 41 when the device is rotated and depressed, respectively. Each of FIGS. 11 through 17 is a drawing showing an example of items displayed on each screen of display 51 by an operation.

Figure 11:
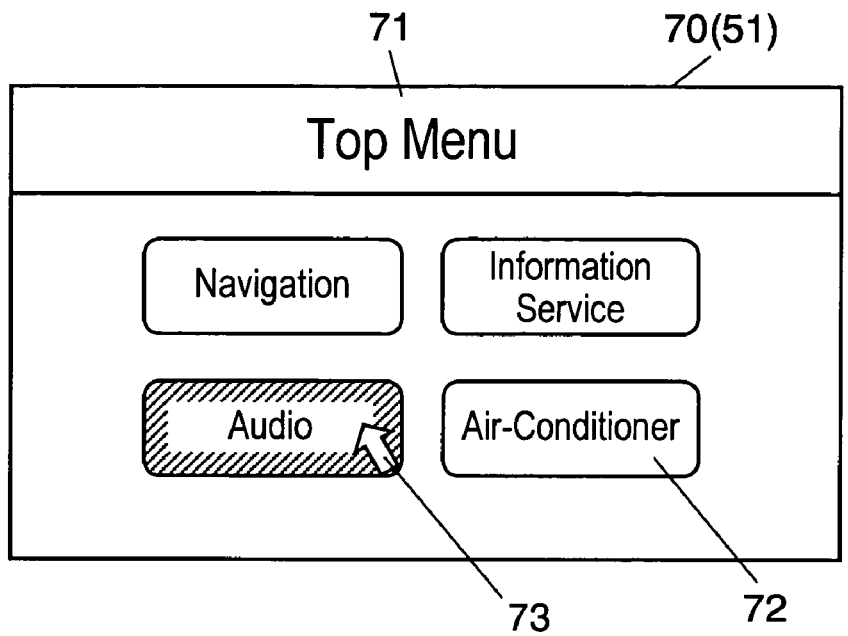
FIGS. 11 and 12 are drawings each showing an example of items displayed on a screen of a display by input operation of the input device in accordance with the first exemplary embodiment of the present invention.

First, depressing switch 62A allocated to a menu, i.e. one of four switches disposed around sphere 31, displays menu headline 71 and various kinds of specific selective functions on display 51, as shown in FIG. 11. As the various kinds of functions, selective menus 72 of four functions, i.e. "Navigation", "Information Service", "Audio", and "Air-Conditioner", are displayed, as shown in the drawing. The display shown in FIG. 11 is hereinafter referred to as "top menu screen" 70.

Along the top edge of top menu screen 70, menu headline 71 is displayed. The remaining display area is substantially equally divided into four cross sections. In the vicinity of substantially the center of each divided section, each selective menu 72 is displayed. Pointer 73 is also displayed on screen 70. As shown in FIG. 11, a specific selective menu 72 is switched to the state of a selection candidate, according to the position of the tip of pointer 73. In the drawings, menu 72 in the state of a selection candidate is hatched in the upper right direction and referred to as a "selection candidate menu". In FIG. 11, the tip of pointer 73 is located in the area "Audio". Thus, "Audio" is in the state of a selection candidate, and is a selection candidate menu.

When an operator rotates sphere 31 in the state shown in FIG. 11, sphere 31 that is stably supported at three points by supporting members 32A, 32B, and 32C disposed in an equiangular manner rotates smoothly. Rotation detector 37 reads a rotating state of sphere 31 and outputs a status signal to controller 38. Based on the signal, controller 38 detects the direction and amount of rotation of sphere 31.

Figure 12:
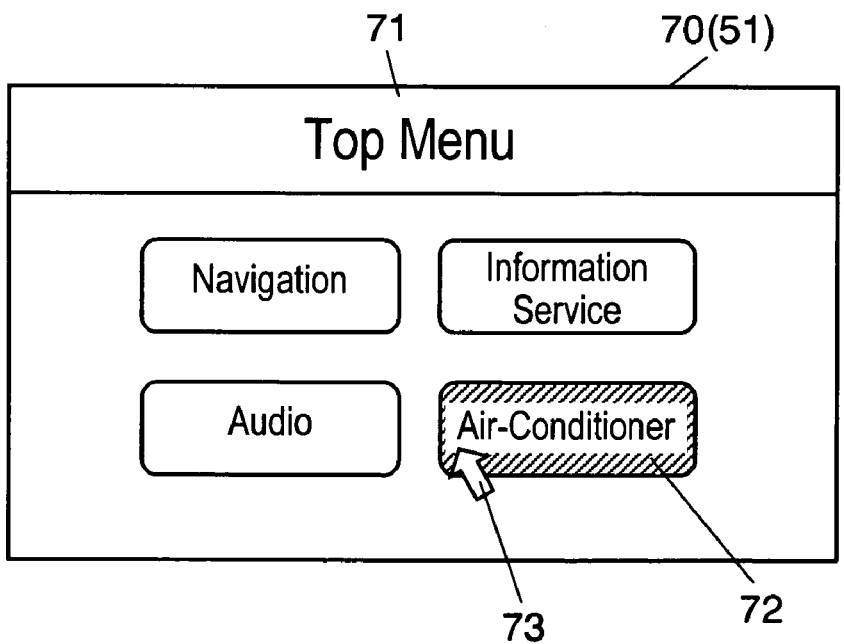

The detection results from controller 38 are transferred to control unit 61. Responsive to the transferred information, control unit 61 generates a specific signal and moves pointer 73 displayed on display 51 along the coordinate, according to the direction, amount, and speed of the transferred information. Then, as shown in FIG. 12, the selection candidate menu is changed to another one. For example, if the tip of pointer 73 moves into the area "Air-Conditioner", the selection candidate menu changes to "Air-Conditioner".

This condition is detailed. When pointer 73 leaves the area "Audio" of selective menu 72 shown in FIG. 11, control unit 61 cancels the selection candidate state of "Audio". Next, when the tip of pointer 73 enters into the area "Air-Conditioner" as shown FIG. 12, for example, control unit 61 switches "Air-Conditioner" to the selection candidate state.

When cancel switch 62B disposed around sphere 31 is operated, control unit 61 causes the display to return to top menu screen 70 or the previous screen.

By rotating sphere 31 as described above, an operator moves the position of pointer 73 and places pointer 73 on desired menu 72 on display 51.

When pointer 72 overlaps with the position of desired menu 72, control unit 61 generates a specific signal to controller 38. Responsive to the signal, controller 38 controls electromagnet 33 so as to make it activated.

The magnetic flux during activation of electromagnet 33 goes from electromagnet 33 through supporting member 32A, sphere 31, and supporting member 32B, and returns to electromagnet 33. Alternatively, the magnetic flux forms a reverse circuit, i.e. a closed loop.

When magnetic force is generated by electromagnet 33, an attractive force is generated between sphere 31 and supporting members 32A and 32B by a change in the magnetic force because electromagnet 33 and supporting members 32A and 32B are fixed. According to this attractive force, a large friction force is exerted between sphere 31 and supporting members 32A and 32B. This change causes an operator to operate sphere 31 with a larger rotating force. Thus, while an operator operates sphere 31 with his/her finger, the force necessary for rotating sphere 31, i.e. the operating member, changes. For this reason, the operator can surely recognize that pointer 73 overlaps with the position of desired menu 72 with tactile feedback without looking at display 51.

An example of selecting menu 72 is described above. However, the rotating force can be changed for other applications. For example, a "click" touch can be provided during rotating operation. The outline of the operation is described hereinafter with reference to time diagrams of FIGS. 8A through 8D.

Figure 8A:
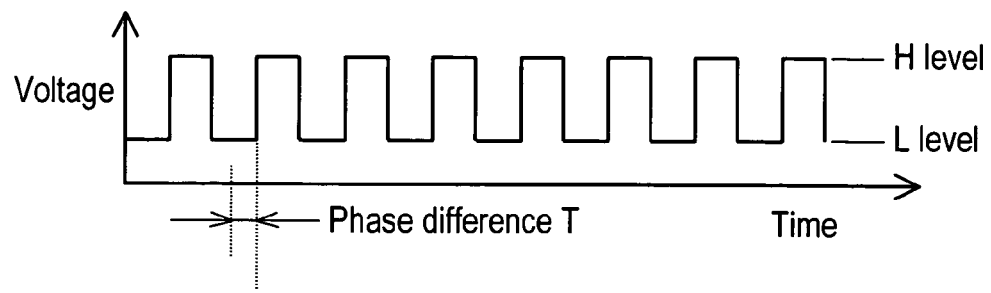
FIGS. 8A and 8B are time diagrams each showing signals supplied from a rotation detector of the trackball device in accordance with the first exemplary embodiment of the present invention.
Figure 9A:
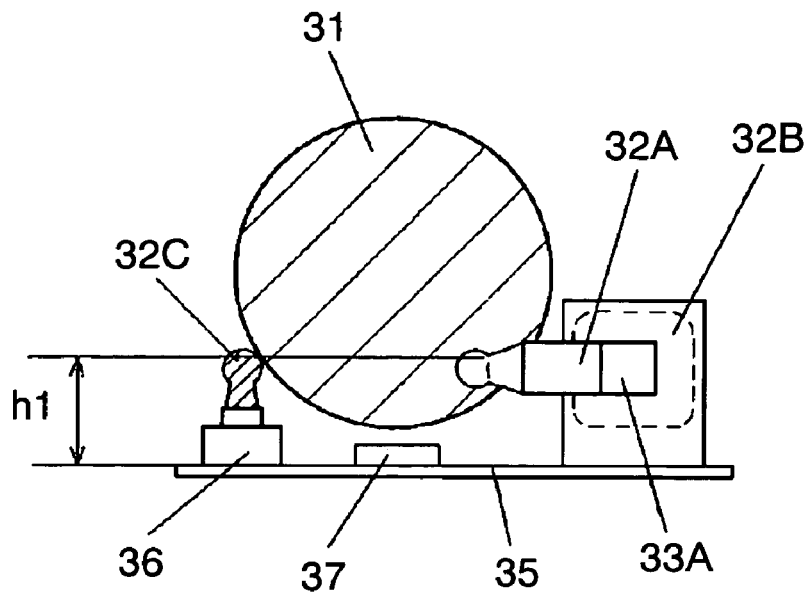
FIG. 9A is a sectional side elevation view of the trackball device of FIG. 1 when the device is rotated.
Figure 9B:
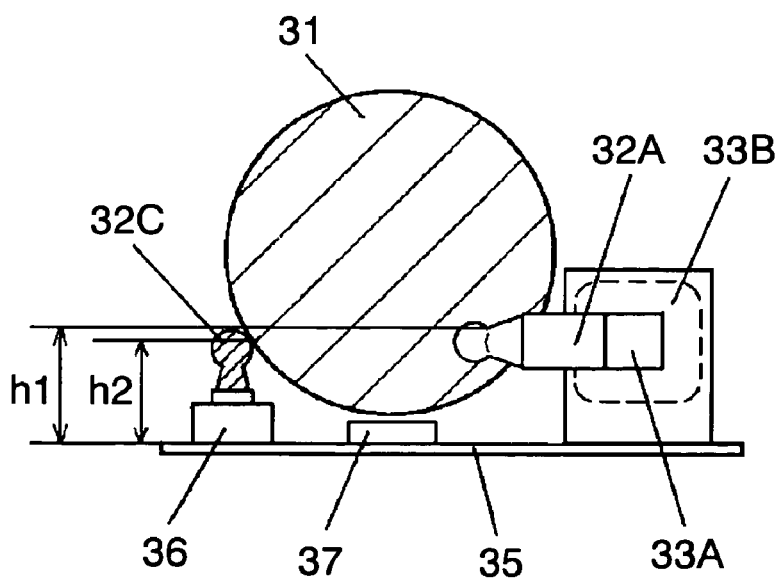
FIG. 9B is a sectional side elevation view of the trackball device of FIG. 1 when the device is depressed.

FIG. 8A shows a time diagram of signals supplied from rotation detector 37 when sphere 31 rotates in a given direction. The vertical axis represents voltage and the horizontal axis represents time. As logical output, "H level" and "L level" are alternately supplied. This indicates that sphere 31 is rotated at a uniform speed.

Figure 8B:
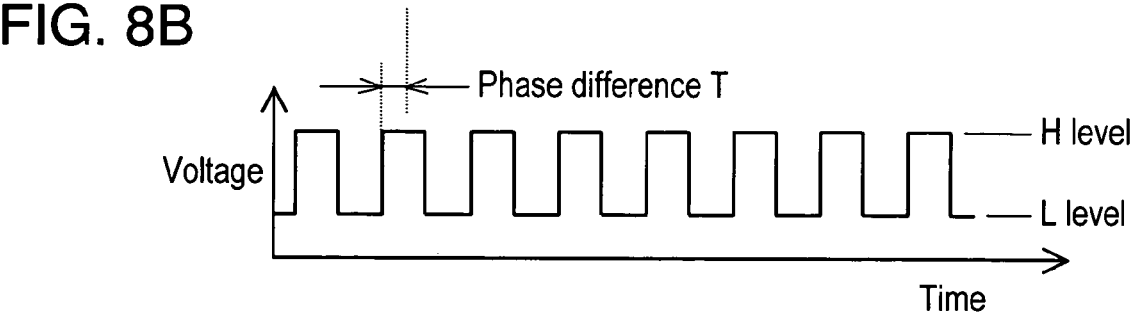

FIG. 8B is a signal time diagram similar to FIG. 8A. When being compared to the time diagram of FIG. 8A at the same time, the time diagram of FIG. 8B is displaced by phase difference T shown by the dotted line and thus the direction of rotation can be determined. In other words, depending on whether phase difference T is a positive amount or negative amount, the direction of rotation of sphere 31 is determined. Thus, from the two time diagrams, i.e. FIGS. 8A and 8B, the amount of rotation of sphere 31 including the direction of rotation can be obtained.

Such two signals are considered in pairs and generally called a "two-phase encoder signal". It is possible to electrically indicate planar movement, such as trackball 41, using two pairs of two-phase signals of encoders disposed so as to supply output in the orthogonal direction. For simplicity, only one direction is described hereinafter.

Figure 8C:
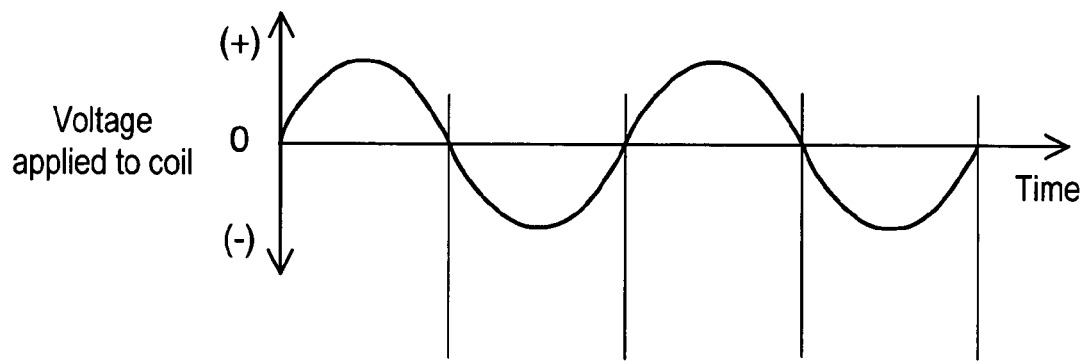
FIG. 8C is a time diagram showing a waveform of voltage applied to a coil of the trackball device in accordance with the first exemplary embodiment of the present invention.

FIG. 8C shows a time diagram of a waveform of voltage applied to coil 33B that constitutes electromagnet 33. The vertical axis represents voltage applied to coil 33B. The horizontal axis represents time. FIG. 8C shows the timing at the same time as FIGS. 8A and 8B. FIG. 8C shows a change in the operating voltage of electromagnet 33 according to the amount of rotation of sphere 31.

Figure 8D:
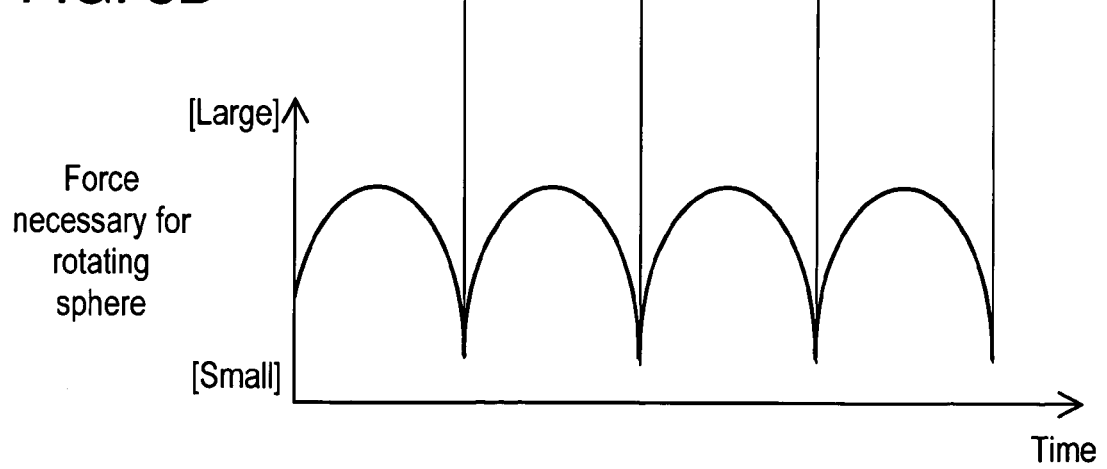
FIG. 8D is a time diagram showing a change in force necessary for rotating a sphere of the trackball device in accordance with the first exemplary embodiment of the present invention.

The change in the operating voltage of electromagnet 33 causes a change in the magnetic force exerted between sphere 31 and supporting members 32A and 32B, thus resulting in a change in the attractive force. Accordingly, the friction force between sphere 31 and supporting members 32A and 32B changes. As a result, as shown in FIG. 8D, the force necessary for rotating sphere 31 depends on the absolute value of the operating voltage of electromagnet 33. As described above, the change in the force necessary for operating sphere 31 repeats according to a specific amount of rotation. In other words, during rotation of trackball 41, the operator feels the change of the operating force as a click touch.

In FIG. 8C, the waveform of voltage applied to coil 33B is described as sine waves. However, to enhance the click touch, triangular waves or rectangular waves can be used. Alternatively, to enhance the feature of the touch, a plurality of pulse-shaped signals can be combined and applied to the coil. Additionally, to increase driving efficiency, techniques including pulse width modulation can be used.

The direction of the magnetic flux is alternately switched by appropriately switching the polarity of the voltage applied to coil 33B as described above. This reduces magnetization of core 33A, supporting members 32A and 32B, and sphere 31. With small magnetization thereof, substantially no attractive force occurs between electromagnet 33 and sphere 31 while electromagnet 33 is inactive. In other words, because the friction force between sphere 31 and supporting members 32A and 32B does not change, initial light operating force is maintained. Thus, a desired sense of operation can be maintained for an extended period of time without additional cost.

Then, an operator who recognizes that pointer 72 overlaps with desirable menu 72 with tactile feedback as described above successively depresses sphere 31.

As shown in FIG. 9A, in a state before sphere 31 is depressed including during rotation, supporting members 32A through 32C stably support sphere 31. Because supporting members 32A through 32C have the same height, sphere 31 is supported at height h1 from the top surface of substrate 35.

As shown in FIG. 9B, even when sphere 31 is depressed from the upper direction, supporting members 32A and 32B still support sphere 31 at height h1 from the top surface of substrate 35. On the other hand, supporting member 32C supports sphere 31 at height h2 smaller than height h1. In other words, even when sphere 31 is depressed, the heights of supporting members 32A and 32B do not change. In contrast, only supporting member 32C connected and fixed onto the key top of depression type switch 36 is depressed by sphere 31 and lowered by the mechanical operating stroke of switch 36. According to this movement, the state of switch 36 is changed.

Because switch 36 is connected to controller 38, this status change signal is sent to control unit 61 via controller 38. Receiving the signal from controller 38, control unit 61 actuates a specific function allocated to desired menu 72. In other words, depressing sphere 31 while "Air-Conditioner" shown in FIG. 12 is a selection candidate menu actuates switch 36 disposed under sphere 31. The signal is detected by controller 38. Responsive to the signal from controller 38, control unit 61 determines that the "Air-Conditioner" function in the selection candidate state is selected and displays the screen of a next layer on display 51.

As described above, in this embodiment, rotation of sphere 31 is an operation of selecting menu 72 and depression of sphere 31 is an operation of determining menu 72. This allows selection and determination of desired menu 72 to be performed by a series of operations of sphere 31 only.

Activating electromagnet 33 during depression of sphere 31 allows two supporting members 32A and 32B connected to electromagnet 33 to attract sphere 31. Thus, supporting members 32A and 32B serve as fulcrums, the force of depressing sphere 31 as an effort, and supporting member 32C as a load. This reduces unnecessary rocking of sphere 31 caused when sphere 31 is depressed; thus, the state of switch 36 can stably be switched.

Figure 10:
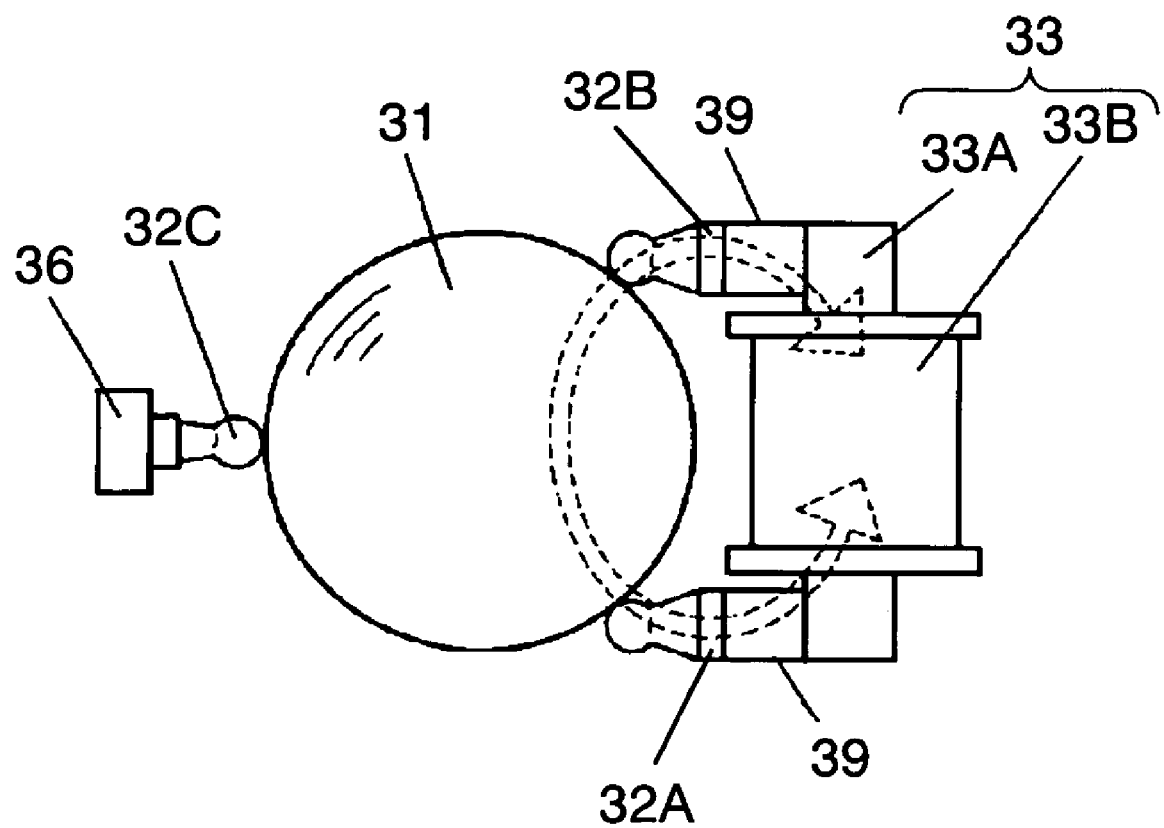
FIG. 10 is a top view of another trackball device in accordance with the first exemplary embodiment of the present invention.

As shown in FIG. 10, permanent magnets 39 structured to force supporting members 32A and 32B against sphere 31 can be disposed so that the magnetic flux of permanent magnets 39 forms a closed magnetic circuit together with sphere 31. In this structure, magnetic field of permanent magnets 39 influences sphere 31, temporarily holding sphere 31. Thus, even when being subjected to external vibrations with electromagnet 33 inactive, sphere 31 does not move accidentally.

Figure 13:
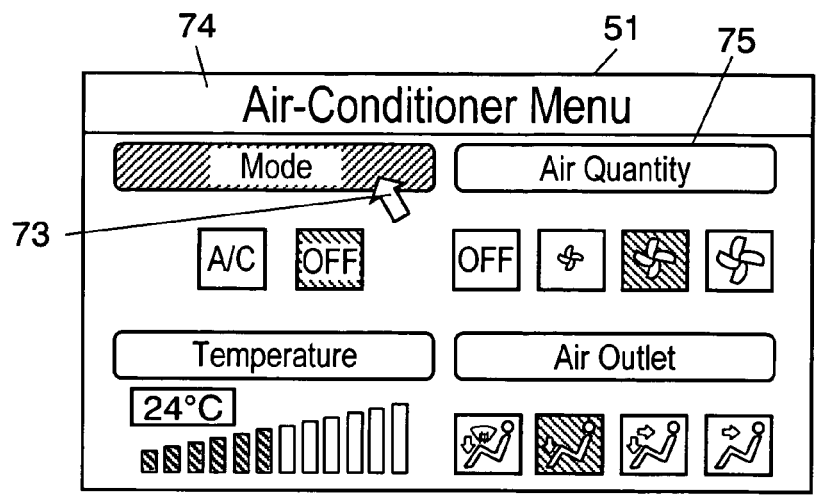
FIGS. 13 through 15 are drawings each showing another example of items displayed on the screen of the display by input operation of the input device in accordance with the first exemplary embodiment of the present invention.

Next, a description is provided of the operations after the selection of the "Air-Conditioner" function is determined. FIG. 13 shows the screen of a next layer. Also in this screen, menu headline 74 is displayed along the top edge. The remaining display area is substantially equally divided into four cross sections. Along the top edge of each section, the name of individual menu 75 is displayed. Pointer 73 is also displayed.

Figure 14:
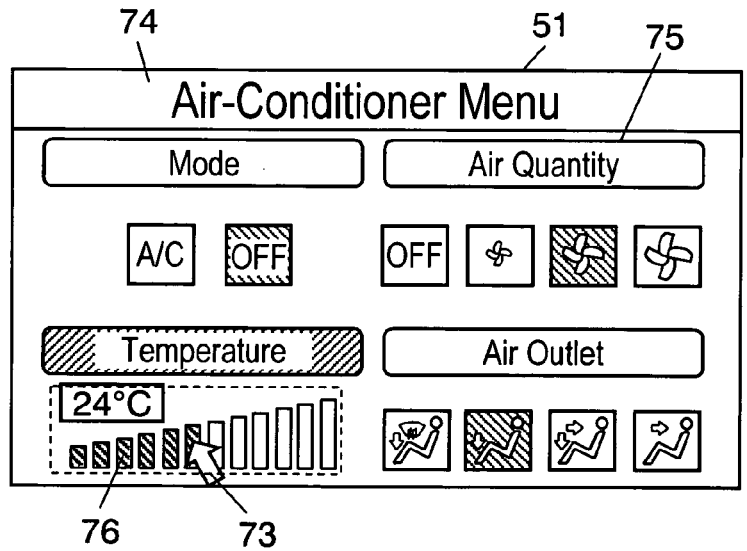
Figure 15:
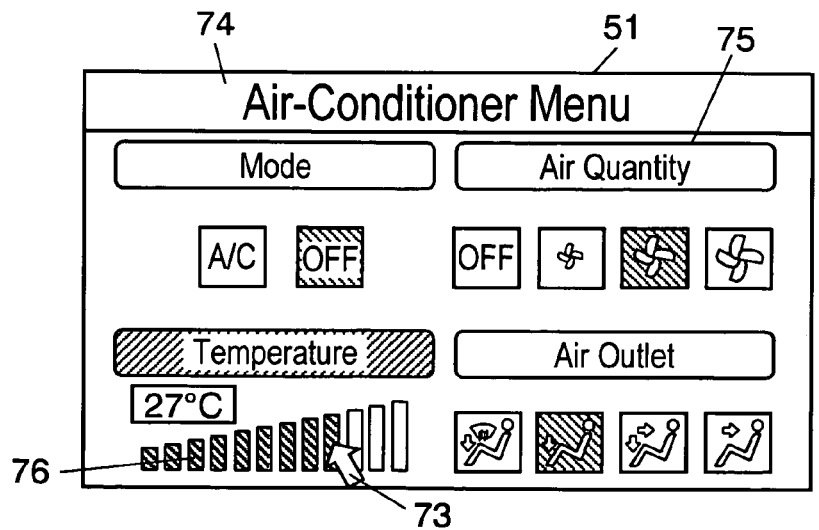

Further, in the remaining area in each menu 75, icons, bar graphs or the like to be set up in each menu 75 are displayed. As shown by hatching in the lower right direction in the drawing, the state currently set is displayed so that it can be recognized by an operator. In FIGS. 13 through 15, the state currently set is shown by hatching in the lower right direction.

Also in the screen shown in FIG. 13, an operator moves the pointer 73 by rotation of sphere 31 to switch the selection candidate menu. When the selection candidate menu is switched, controller 38 controls electromagnet 33 to give feedback to the operator as to which item is selected (the position of pointer 73), similar to the case as described above.

In the following, descriptions are provided of the operations of switching the selection candidate menu from "Mode" as shown in FIG. 13 to "Temperature" by rotation of sphere 31 to change the preset temperature inside of the vehicle.

First, as described above, an operator rotates sphere 31 so that pointer 73 moves onto "Temperature" menu 75 on display 51. As shown in FIG. 14, temperature bar graph 76 for changing the preset temperature inside of the vehicle is displayed below the selective menu name in the "Temperature" section. Temperature bar graph 76 is structured so that substantially square-shaped bars corresponding to respective temperatures are laterally arranged at regular intervals.

Then, when the operator depresses sphere 31 in the "Temperature" section, the system changes to a state in which the preset temperature of the air-conditioner in the vehicle cabin can be set. In other words, depressing operation of sphere 31 activates the portion surrounded by the dotted line in FIG. 14. At the same time, pointer 73 moves so that its tip is placed on the bar showing the current preset temperature.

At this time, temperature bar graph 76 becomes equivalent to a selection candidate menu. In other words, all the bars from one showing the lowest temperature to one showing the currently preset temperature change to the state of a selection candidate menu (hatched in the upper right direction), as shown in FIG. 14.

In this state, the operator rotates sphere 31 to laterally move pointer 73 in the area surrounded by the dotted line, and places the tip of pointer 73 on a desired preset temperature. For example, when the previously preset temperature is 24° C. and the desired temperature is 27° C., the tip of pointer 73 is placed on the bar corresponding to 27° C. At this time, the bars corresponding to 25° C., 26° C., and 27° C. sequentially change to the display state of a selection candidate menu, according to the position of the tip of pointer 73.

After placing the tip of pointer 73 on the bar corresponding to the desired preset temperature, the operator depresses sphere 31 by his/her fingertip or palm sequentially after a series of operations. Thus, the change of the preset temperature is determined. This operation of depressing sphere 31 completes determination of the preset temperature and deactivates the area in the dotted line at the same time. Thus, as shown in FIG. 15, the menu goes back to the state in which the selection candidate menu is only "Temperature" in selective menu 75.

As described above, only sequential input operations of sphere 31 using a fingertip or palm can actuate specific functions, e.g. change of temperature setting inside of a vehicle, with excellent operability. Movement of pointer 73, detection of the tip position of pointer 73, operation and stopping of air-conditioner 54 until the temperature inside of the vehicle is changed, and the like are controlled by control unit 61.

In a series of input operations for changing the preset temperature inside of the vehicle, it is preferable that the tip of pointer 73 is unlikely to move outside of the active area, i.e. the area surrounded by the dotted line shown in FIG. 14. This function can be realized by adding the feedback function of electromagnet 33 to sphere 31. This further facilitates selecting operation. In other words, because sphere 31 can freely rotate in any direction, sphere 31 may be rotated so that the tip of pointer 73 moves out of the area surrounded by the dotted line. In such a case, controller 38 may control electromagnet 33 so that the rotating operation force necessary for rotating sphere 31 is increased to continuously provide a kind of braking function. This structure can prevent operation in irrelevant directions using tactile feedback.

Further, click touches may be obtained by intermittently activating electromagnet 33, for example, every time the tip of pointer 73 moves onto respective bars in temperature bar graphs 76. This further facilitates selecting operation and makes it more accurate. An operator also can distinguish between the click touch and braking function easily. Thus, these functions can be combined.

Additionally, it is preferable that switches 62C and 62D be allocated to work as a positive switch and negative switch, respectively, in changing the preset temperature in temperature bar graph 76. This increases the alternatives of operation so that operators can perform input operations as they like.

As shown in FIGS. 14 and 15, the menus related to the air-conditioner include the following three modes other than "Temperature" for changing the preset temperature inside of the vehicle. They are "Mode" for switching automatic operation and manual operation of the air-conditioner, "Air Quantity" for changing the air quantity, and "Air Outlet" for changing air outlets. For changing these settings, the same operations are possible. In other words, based on rotating and depressing operations of sphere 31, an operator can select and determine an item from a selection candidate menu while moving pointer 73 in an active area, to operate each function. Because the basic operating procedure and how a feedback function operates at that time are substantially the same as those of the case of the temperature, descriptions are omitted.

The four menus related to the air-conditioner are located in the positions adjacent to each other. Thus, after the setting of a temperature, pointer 73 can be moved onto "Air Outlet" for sequential setting of an air outlet. Also at this time, the operator can switch between respective functions only by rotating sphere 31 using his/her fingertip or palm because the sphere is rotatable in any direction.

Next, the operation of each menu other than the air-conditioner in top menu screen 70 is outlined.

Figure 16:
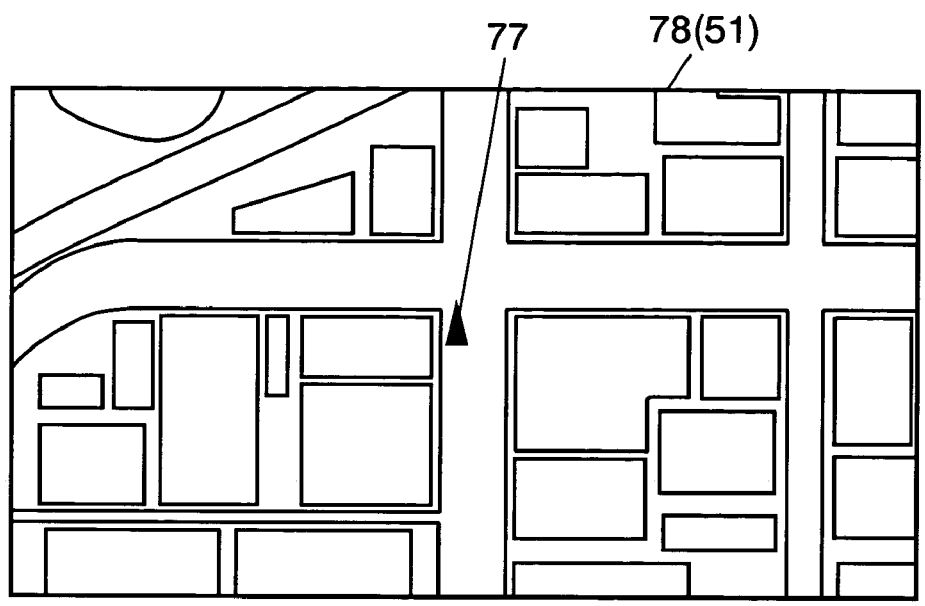
FIGS. 16 and 17 are drawings each showing still another example of items displayed on the screen of the display by input operation of the input device in accordance with the first exemplary embodiment of the present invention.
Figure 17:
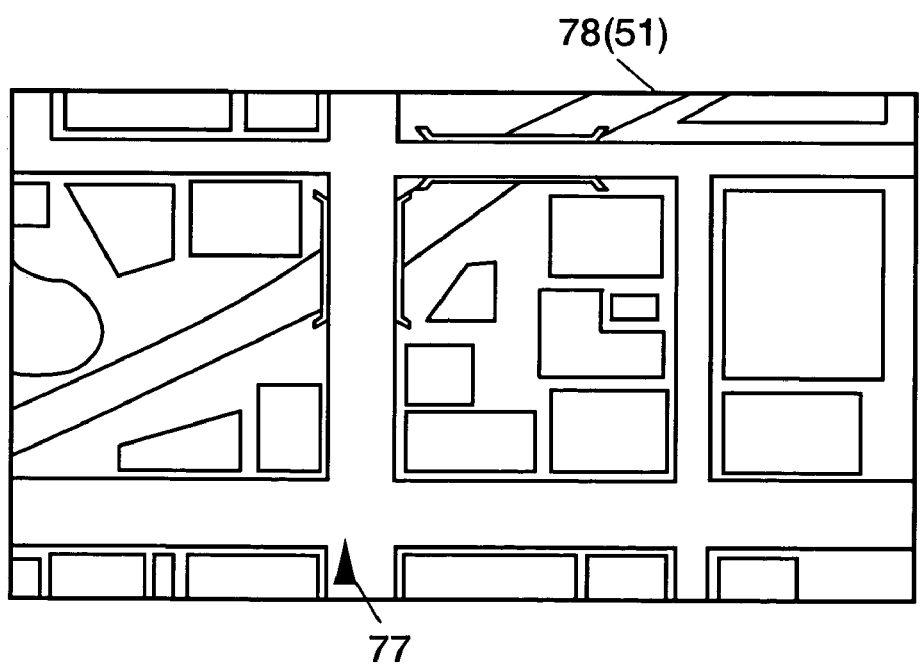

When sphere 31 is rotated and depressed with top menu screen 70 shown in FIG. 11 to select and determine "Navigation", and after some screens of layers not shown in the drawings are displayed, display 51 provides the screen shown in FIG. 16. This drawing shows a road map (hereinafter referred to as a "map") 78 centered around current position 77 of the vehicle that is indicated by the triangular mark.

When positive switch 62C around sphere 31 is depressed in this display state, control unit 61 causes map 78 to be zoomed in. When negative switch 62D is depressed, control unit 61 causes map 78 to be zoomed out. When sphere 31 is rotated, control unit 61 causes map 78 to be scrolled in any direction throughout 360° according to the direction and amount of the rotation. For example, as shown in 17, the form of roads and traffic jam information from current position 77 toward a destination is displayed on display 51 promptly and accurately. By depressing operation of sphere 31, the display can be returned to the screen of FIG. 16 centered around current position 77. With this structure, the operator can easily recognize the conditions toward the destination by a series of operations of rotation and depression of sphere 31. Additionally, the operator can perform the series of operations using his/her fingertip or palm easily in a relaxed condition.

Operations of the items "Audio" and "Information Service" shown in top menu screen 70 of FIG. 11 are substantially the same as the examples of operations described above. For this reason, detailed descriptions and examples of items on the screen in those cases are omitted. In "Audio" for operating audio device 52, setting of the sound volume, equalizer, and tracks to be repeated, and the like can be performed. In "Information Service" for operating information terminal device 55, browsing web pages and viewing e-mails, and the like can be performed by similar operations. In any case, trackball device 41 is based on the operation of rotating sphere 31. Further, when switch 36 for detecting depression of sphere 31, and push type switches 62A through 62D disposed in the periphery of sphere 31 are operated, desired operation of various kinds of equipment can be performed. For this reason, input device 64 including the trackball device 41 and switches 62A through 62D facilitates input operation only using a fingertip and palm without the need of a large action during operation.

Because input device 64 is placed in the central position of the full width of a vehicle cabin, any person sitting in the vicinity of the device can share the device for operation. Because the operations are mainly rotation and depression of sphere 31, a user can operate the device with either hand and thus the device is user-friendly.

Figure 18:
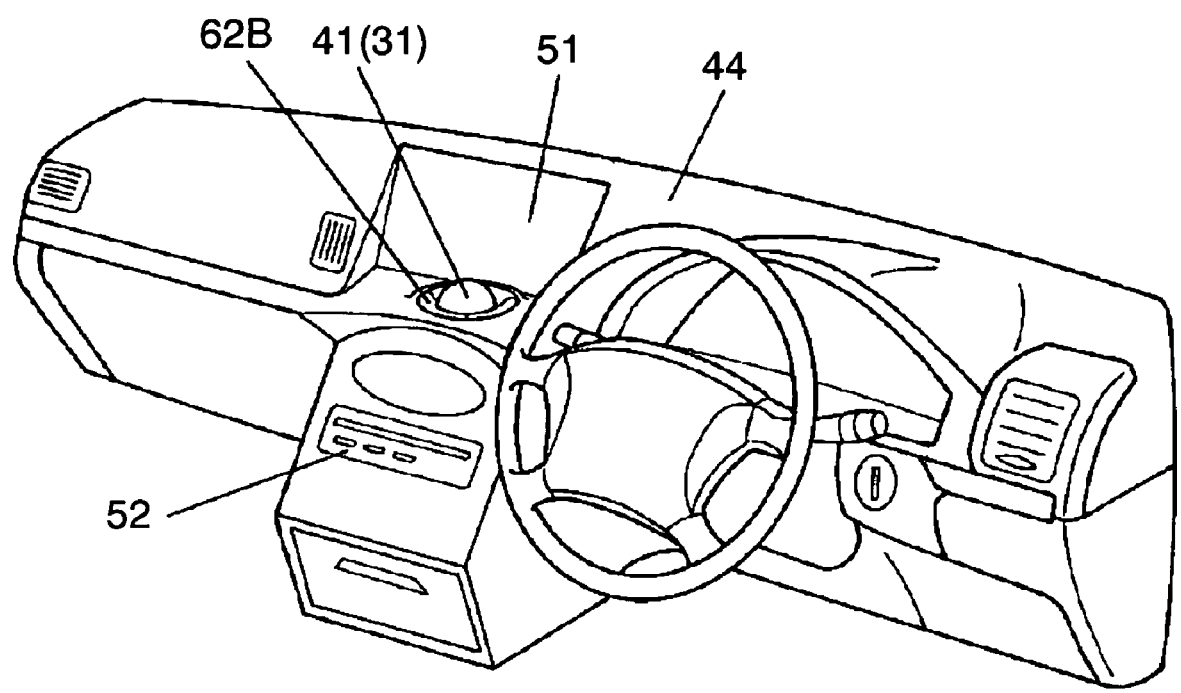
FIG. 18 is a perspective view of an essential part of a vehicle interior when the input device including the trackball device in accordance with the first exemplary embodiment of the present invention is incorporated in the vicinity of the center of an instrument panel.

When input device 64 is disposed in a place other than a console portion, it has similar operability. For example, as shown in FIG. 18, the device can be placed in the vicinity of the center of instrument panel 44 and other places. Especially when input device 64 is placed at the tip of the armrest of driver seat 47 or front passenger seat 48, i.e. the place in contact with the driver's or front passenger's palm when he/she places his/her elbow on the armrest, the device can be operated in an extremely relaxed condition.

In this embodiment, audio device 52, navigation device 53, air-conditioner 54, and information terminal device 55 are described as examples of various kinds of electronic equipment. Further, other electronic equipment can be incorporated into a vehicle so as to be operable with input device 64 via menu layers. For example, the positions of seats, mirror angle, imaging direction of a back monitor camera, luminance of interior lighting, and the like can be adjusted by the operation of input device 64.

In the description with reference to FIG. 7, various kinds of electronic equipment (e.g. audio device 52, navigation device 53, air-conditioner 54, and information terminal device 55) are directly connected to control unit 61. Other than this structure, controllers can be provided separately for each piece of various kinds of electronic equipment. These controllers are connected to bus lines or a network connected to control unit 61. This structure increases detachability of equipment and thus provides an input device excellent in ease of maintenance.

In this embodiment, controller 38 of trackball device 41 and system control unit 61 are provided independently. However, they can be integrally structured.

As described above, for electronic equipment using trackball device 41 of this embodiment, an operator can recognize the operating states by a change in the rotating operation force of sphere 31 that is felt by the operator's finger or the like rotating sphere 31. In other words, electromagnet 33 and sphere 31 work as an informer that informs the operator of auxiliary information. At that time, the operator doesn't have to look at the movement of pointer 73 or the change of icons on display 51. Additionally, if the change in the rotating operation force is used as a click touch according to the amount of rotation of sphere 31, user-friendliness further improves. Such trackball device 41 is especially preferable to be incorporated into a vehicle for operation of other devices incorporated into the vehicle.

Further, providing switch 36 that is switched by depression of sphere 31 in addition to this structure allows an operator to sequentially select and determine a desired icon. This reduces efforts of the operator and improves operating efficiency.

In the trackball device of this embodiment, fixed supporting members 32A, 32B, and 32C rotatably support sphere 31, and rotation detector 37 provided under sphere 31 detects the rotation of sphere 31. Other than this structure, rotating spheres or two rollers having axes at right angles to each other can be provided to support sphere 31. Rotating these spheres or rollers together with sphere 31 can reduce the rotating operation force. Instead of rotation detector 37, a detector for detecting the amount of rotation of the rollers can be provided to detect the rotation of sphere 31. Any structure in which interference of force with sphere 31, i.e. an increase in friction force, is generated by the influence of attractive force due to magnetic force to change the rotating operation force of sphere 31 is included in the scope of the present invention.

During operation of an input device of this embodiment, rotation of sphere 31 is mainly performed. Additionally, sphere 31 is a member operable in any direction. For this reason, specific input operations can be performed on input device 64 disposed in the central position from the side of front passenger seat 48 as well as the side of driver seat 47. Thus, desired operations can be smoothly performed on various kinds of electronic equipment represented by audio device 52, navigation device 53, air-conditioner 54, and information terminal device 55. Additionally, an operator can freely rotate sphere 31 in each direction with his/her fingertip or palm without moving his/her elbow. For this reason, the operator can operate the device in a comfortable posture and relaxed condition.

In this embodiment, a case in which trackball device 41 is incorporated into a vehicle is described. Other than this application, the trackball device can be used as an input device of a personal computer or machine tool.

With a diameter of sphere 31 of approx. 50 mm, when a change in operating force is maintained for approx. 10 to 400 ms, proper tactile feedback is given to an operator by magnet 33.

Second Exemplary Embodiment

Figure 19A:
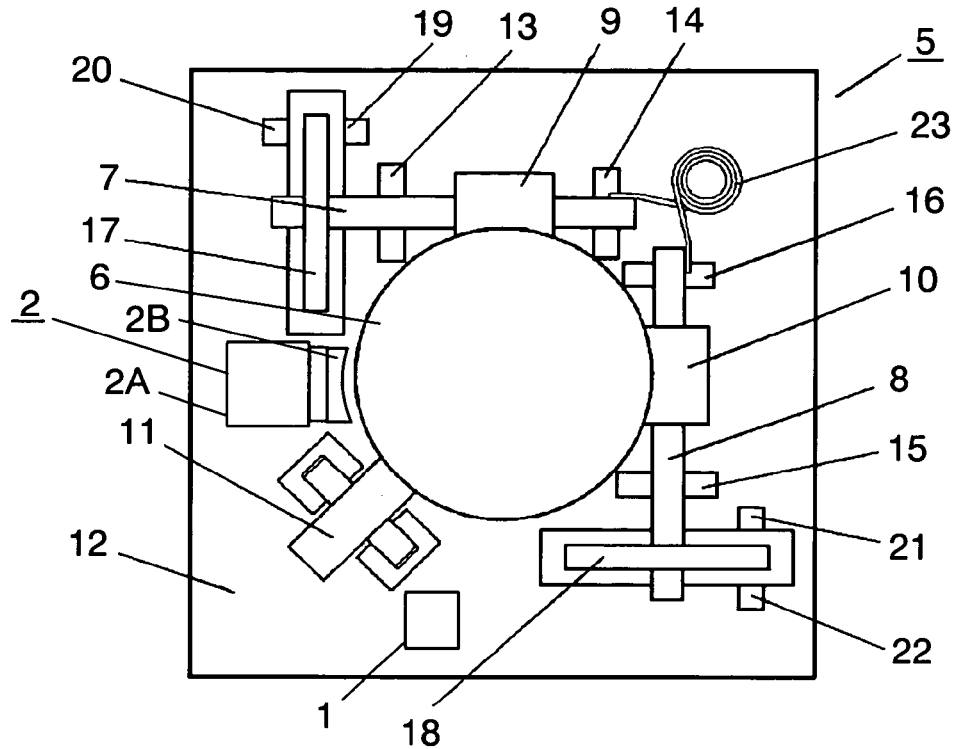
FIG. 19A is a top view of a trackball device in accordance with a second exemplary embodiment of the present invention.
Figure 19B:
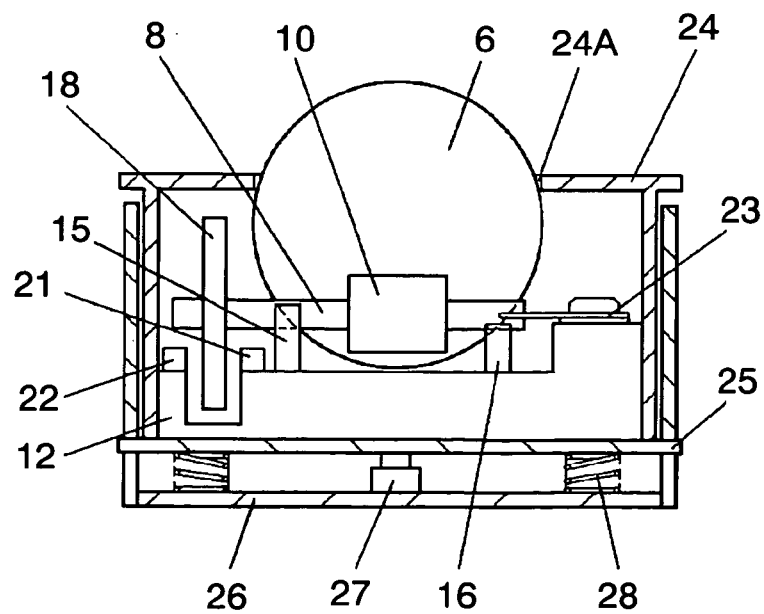
FIG. 19B is a sectional view of the trackball device of FIG. 19A.
Figure 20:
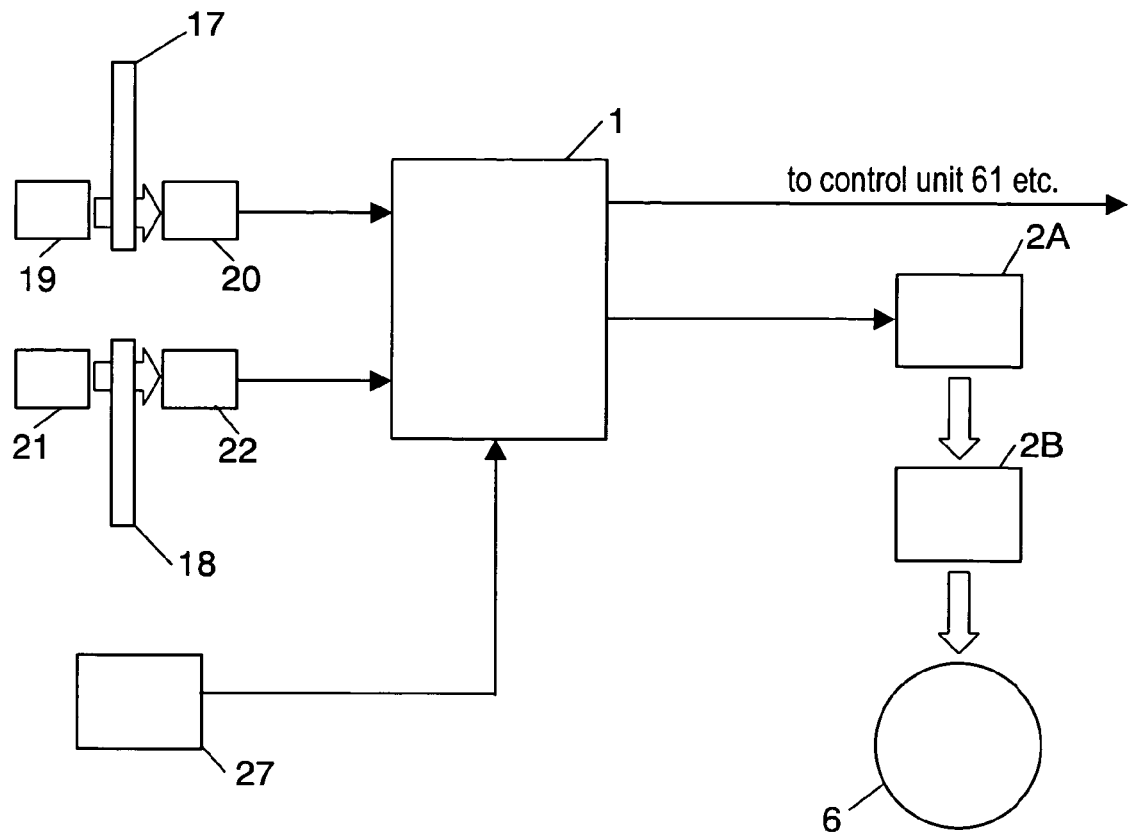
FIG. 20 is a block diagram of the trackball device of FIG. 19A.

FIG. 19A is a top view of a trackball device in accordance with the second exemplary embodiment of the present invention. FIG. 19B is a sectional view thereof. FIG. 20 is a block diagram thereof. Sphere 6 of trackball device 5 is rotatably supported from the bottom side thereof by large-diameter cylindrical main rollers 9 and 10 provided around cylindrical rotating shafts 7 and 8, respectively, and auxiliary roller 11. Sphere 6 is made of rubber material, resin material, or the like. On top surface of base 12, bearings 13, 14, 15 and 16 project to rotatably support corresponding rotating shafts 7 and 8. Bearings 13 and 14 and bearings 15 and 16 are formed in pairs so that rotating shafts 7 and 8 are placed in orthogonal relation.

Rotating shaft 7 is rotatably provided on bearings 13 and 14 so that main roller 9 is placed between bearings 13 and 14. Rotating shaft 8 is rotatably provided on bearings 15 and 16 so that main roller 10 is placed between bearings 15 and 16.

At one end of each of rotating shafts 7 and 8 on the side far from each other, encoder disks 17 and 18 each having openings at a specific pitch of angle are fixed. Light emitting element 19 and light receiving element 20 are opposed on base 12 in positions on both sides of encoder disk 17 so as to sandwich plate 17. Light emitting element 21 and light receiving element 22 are opposed on base 12 in positions on both sides of encoder disk 18 so as to sandwich plate 18.

The other end of each of rotating shafts 7 and 8 on the side adjacent to each other is urged to the side of sphere 6 by return coil spring 23. Main rollers 9 and 10 are always adapted to make contact with the bottom surface of sphere 6. Additionally, rotatable auxiliary roller 11 provided on base 12 is always adapted to make contact with the bottom surface of sphere 6. Rollers 9, 10, and 11 and rotating shafts 7 and 8, and other components form a support.

Cover member 24 covers the outer periphery of base 12 so that the top portion of sphere 6 protrudes from circular opening 24A of cover member 24. The bottom end of cover member 24 is fixed to movable plate 25 to which base 12 is fixed. Movable plate 25 is structured to be vertically movable while maintaining a horizontal position. Disposed on fixed base 26 disposed under movable plate 25 are coil springs 28 for urging depression type switch 27 and movable plate 25 upwardly.

With trackball device 5 as structured above, an operator rotates sphere 6 protruding from opening 24A of cover member 24 in a desired direction. According to the rotation of sphere 6, main rollers 9 and 10 rotate by a specific amount. In other words, encoder disks 17 and 18 rotate by a specific amount via rotating shafts 7 and 8, respectively. Then, light from light emitting element 19 and 21 repeats the states of transmission and non-transmission for a specific period of time. Each of light receiving element 20 and 22 receives this transmitted light. The light-receiving signals are transferred to controller 1. Encoder disks 17 and 18, light emitting element 19 and 21, and light receiving element 20 and 22 form a rotation detector. Based on the results from the rotation detector, controller 1 detects the amount of rotation of each of encoder disks 17 and 18. The detection results of controller 1 are sent to system control unit 61 of the first exemplary embodiment, and thus pointer 73 moves on display 51.

When the operator depresses sphere 6 downwardly as required, the depressing operation force is exerted on movable plate 25 via sphere 6 and base 12. Then, by contracting coil springs 28 against the upward urging force of coil springs 28, movable plate 25 moves vertically and downwardly. At this time, according to the downward movement of movable plate 25, base 12 including sphere 6 and cover member 24 fixed to movable plate 25 also moves downwardly with the other components maintaining a horizontal position. Then, switch 27 disposed under movable plate 25 is depressed by the bottom surface of movable plate 25 and turned on. This switch signal is sensed by controller 1. This performs determination of selection of a desired icon or menu item on which a cursor or the like is placed, or execution of other functions.

Various kinds of electronic equipment are controlled in a manner similar to that of the first exemplary embodiment. In other words, controller 1 corresponds to controller 38 of the first exemplary embodiment. Switch 27 corresponds to switch 36 of the first exemplary embodiment.

When pointer 73 moves according to a rotating operation of sphere 6 and the selection candidate menu changes as described above, controller 1 also outputs a signal to actuator 2. Actuator 2 includes depressing part 2A and rubber pad 2B. Responsive to the signal from controller 1, depressing part 2A forces rubber pad 2B against sphere 6 to provide a change in the rotating force necessary for the operation of sphere 6 for a specific period of time. Depressing part 2A is made of an electromagnetic piston, for example. This gives effects similar to those of the first exemplary embodiment. In the second exemplary embodiment, actuator 2 works as an informer for informing the operator of auxiliary information.

Actuator 2 changes the rotating operation force of sphere 6 by bringing rubber pad 2B into direct and mechanical contact with sphere 6. In this case, maintaining a change in the operating force of sphere 6 for approx. 30 to 200 ms gives proper tactile feedback of switching selection candidate menus to the operator.

Third Exemplary Embodiment

Figure 21:
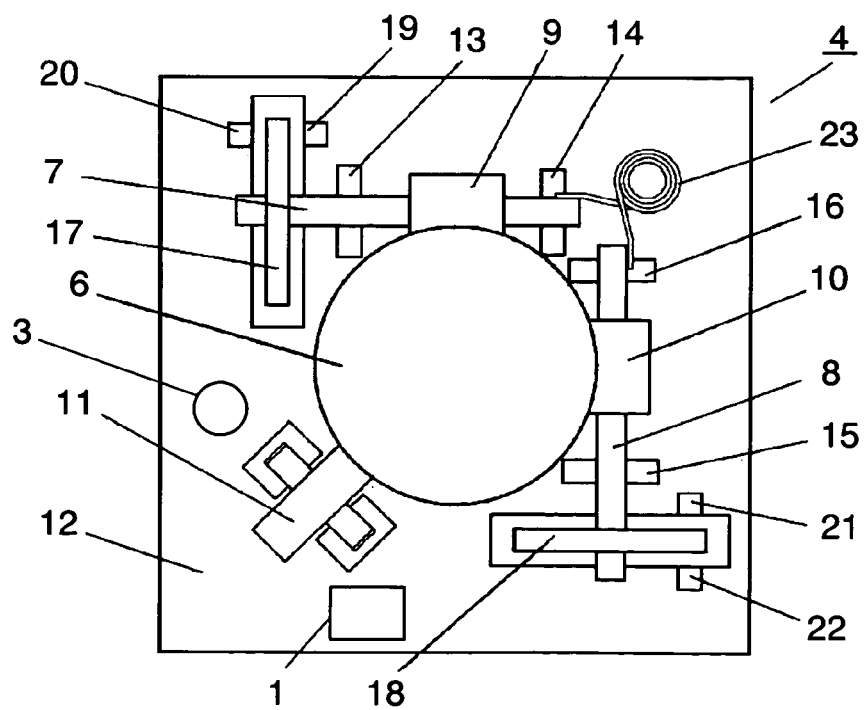
FIG. 21 is a top view of a trackball device in accordance with a third exemplary embodiment of the present invention.
Figure 22:
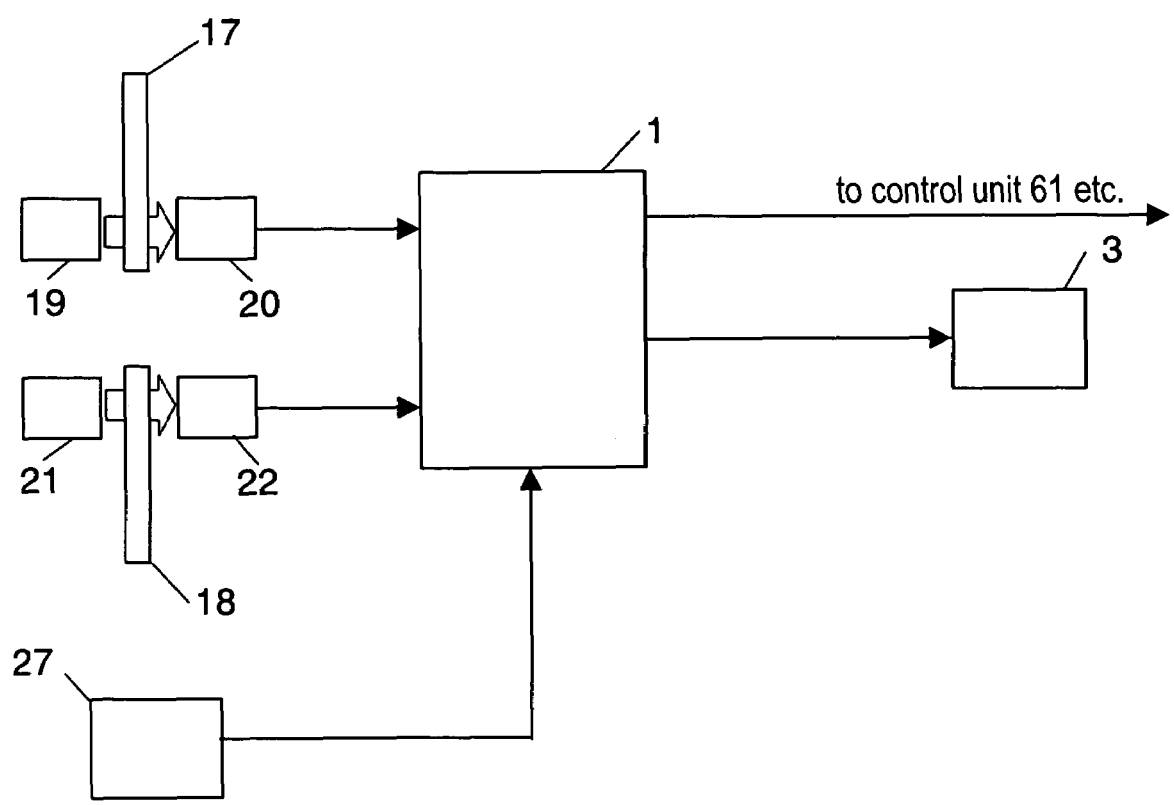
FIG. 22 is a block diagram of the trackball device of FIG. 21.

FIG. 21 is a top view of a trackball device in accordance with the third exemplary embodiment of the present invention. FIG. 22 is a block diagram thereof. In this embodiment, sound generator 3 is provided instead of actuator 2. Other than the sound generator, this structure is similar to that of the second exemplary embodiment. In the third exemplary embodiment, sound generator 3 works as an informer for informing an operator of auxiliary information.

Corresponding to the operation timing of actuator 2 of the second exemplary embodiment, controller 1 causes sound generator 3 to generate sound. Thus, trackball device 4 gives hearing feedback to an operator. Such a structure also improves user-friendliness. Sound generator 3 can be structured of a speaker, microcomputer, and other components, for example.

When sound generator 3 gives feedback to the operator, pitches or tone colors of sound can be changed every time the screen layer changes or the preset temperature of an air-conditioner changes, for example. This can help the operator recognize the situation sensuously.

What is claimed is:

1. A trackball device comprising:
   a sphere including magnetic material;
   a support rotatably supporting said sphere, said support including first, second and third supporting members that are non-rotatable with respect to said sphere and are arranged in contact with said sphere at respectively spaced apart locations;
   a rotation detector provided separately from said support and configured to detect rotation of said sphere and output a signal indicating rotation of said sphere;
   a controller operably coupled to said rotation detector and being configured to generate a specific output signal responsive to the signal from said rotation detector indicating rotation of said sphere; and
   an informer including an electromagnet;
   wherein said sphere is disposed in a magnetic flux circuit generated by said electromagnet such that magnetic flux of said magnetic flux circuit goes from said electromagnet through said first supporting member, said sphere, and said second supporting member, and returns to said electromagnet, with said sphere being located in said magnetic flux circuit between said first and second supporting members; and
   wherein said informer is operable to change a friction force of said sphere with respect to said support by causing said electromagnet to generate a magnetic attractive force to attract said sphere to said first and second supporting members based on said specific output signal from said controller.

2. The trackball device of claim 1, wherein
   said electromagnet has a core with first and second ends; and
   wherein said first supporting member is coupled to said first end of said core, said second supporting member is coupled to said second end of said core, and said third supporting member is independent of said core.

3. The trackball device of claim 2, wherein
   a surface material of said first supporting member, said second supporting member, and said third supporting member is the same as a surface material of said sphere.

4. The trackball device of claim 2, further comprising
   a first switch arranged to be depressed by said sphere via said third supporting member;
   wherein said controller is operable to detect a state of said first switch.

5. The trackball device of claim 2, wherein
   said controller is operable to switch alternately a direction of the magnetic flux generated by the electromagnet.

6. The trackball device of claim 1, wherein
   said controller is operable to switch alternately a direction of the magnetic flux generated by the electromagnet.

7. The trackball device of claim 1, further comprising
   a permanent magnet configured to have a magnetic field that influences said sphere so as to force said support against said sphere.

8. The trackball device of claim 7, wherein
   said permanent magnet is located so that a direction of magnetic lines generated by said permanent magnet coincides with a direction of magnetic lines generated by said electromagnet.

9. The trackball device of claim 7, wherein
   said electromagnet has a core with first and second ends, said first supporting member is coupled to said first end of said core, said second supporting member is coupled to said second end of said core, and said third supporting member is independent of said core.

10. The trackball device of claim 9, wherein
    a surface material of said first supporting member, said second supporting member, and said third supporting member is the same as a surface material of said sphere.

11. The trackball device of claim 9, further comprising
    a first switch arranged to be depressed by said sphere via said third supporting member;
    wherein said controller is operable to detect a state of said first switch.

12. The trackball device of claim 7, wherein
    said controller is operable to switch alternately a direction of the magnetic flux generated by said electromagnet.

13. An input device comprising
    a trackball device, and
    at least one switch disposed around said trackball device,
    wherein said trackball device comprises:
        a sphere including a magnetic material;
        a support rotatably supporting said sphere, said support including first, second and third supporting members that are non-rotatable with respect to said sphere and are arranged in contact with said sphere at respectively spaced apart locations;
        a rotation detector provided separately from said support and configured to detect rotation of said sphere and output a signal indicating rotation of said sphere;
        a controller operably coupled to said rotation detector and being configured to generate a specific output signal responsive to the signal from said rotation detector indicating rotation of said sphere; and
        an informer including an electromagnet;
        wherein said sphere is disposed in a magnetic flux circuit generated by said electromagnet such that magnetic flux of said magnetic flux circuit goes from said electromagnet through said first supporting member, said sphere, and said second supporting member, and returns to said electromagnet, with said sphere being located in said magnetic flux circuit between said first and second supporting members; and
    wherein said informer is operable to change a friction force of said sphere with respect to said support by causing said electromagnet to generate a magnetic attractive force to attract said sphere to said first and second supporting members based on said specific output signal from said controller.

14. The input device of claim 13, wherein
said electromagnet has a core with first and second ends; and
wherein said first supporting member is coupled to said first end of said core, said second supporting member is coupled to said second end of said core, and said third supporting member is independent of said core.

15. The input device of claim 13, further comprising
a permanent magnet configured to have a magnetic field that influences said sphere so as to force said support against said sphere.

16. A vehicle comprising
a vehicle body having a vehicle cabin therein,
a drive wheel supporting said vehicle body, and
a trackball device provided in said vehicle cabin,
wherein said trackball device comprises:
   a sphere including magnetic material;
   a support rotatably supporting said sphere, said support including first, second and third supporting members that are non-rotatable with respect to said sphere and are arranged in contact with said sphere at respectively spaced apart locations;
   a rotation detector provided separately from said support and configured to detect rotation of said sphere and output a signal indicating rotation of said sphere;
   a first controller operably coupled to said rotation detector and being configured to generate a specific output signal responsive to the signal from said rotation detector indicating rotation of said sphere; and
   an informer including an electromagnet;
   wherein said sphere is disposed in a magnetic flux circuit generated by said electromagnet such that magnetic flux of said magnetic flux circuit goes from said electromagnet through said first supporting member, said sphere, and said second supporting member, and returns to said electromagnet, with said sphere being located in said magnetic flux circuit between said first and second supporting members; and
wherein said informer is operable to change a friction force of said sphere with respect to said support by causing said electromagnet to generate a magnetic attractive force to attract said sphere to said first and second supporting members based on said specific output signal from said controller.

17. The vehicle of claim 16, wherein
said electromagnet has a core with first and second ends; and
wherein said first supporting member is coupled to said first end of said core, said second supporting member is coupled to said second end of said core, and said third supporting member is independent of said core.

18. The vehicle of claim 16, further comprising:
a second controller configured to receive the output signal from said first controller; and
electronic equipment configured to be controlled by said second controller.

19. The vehicle of claim 16, wherein
said electronic equipment includes a display for displaying at least one of a pointer and a cursor, and rotation of said sphere causes movement of at least one of said pointer and said cursor on said display.

20. The vehicle of claim 16, wherein
said trackball device is disposed in a central position of a full width of said vehicle cabin.

21. The vehicle of claim 16, further comprising
two seats in a front portion of said vehicle cabin, wherein said trackball device is disposed between said two seats.

22. A vehicle of claim 16, further comprising
a permanent magnet configured to have a magnetic field that influences said sphere so as to force said support against said sphere.

23. The vehicle of claim 22, further comprising:
a second controller for receiving the output signal from said first controller; and
electronic equipment controlled by said second controller.

24. The vehicle of claim 22, wherein
said electronic equipment includes a display for displaying at least one of a pointer and a cursor, and rotation of said sphere causes movement of at least one of said pointer and said cursor on said display.

25. The vehicle of claim 22, wherein
said trackball device is disposed in a central position of a full width of said vehicle cabin.

26. The vehicle of claim 22, further comprising
two seats in a front portion of said vehicle cabin, wherein said trackball device is disposed between said two seats.

27. The trackball device of claim 1, wherein:
said sphere consists of one of martensite stainless steel and ferrite stainless steel;
wherein said informer is configured to generate auxiliary information responsive to rotating of said sphere, the auxiliary information being based on the output signal from said controller;
wherein said informer is operable to generate the auxiliary information by causing said electromagnet to generate the magnetic attractive force to influence said sphere.

28. The trackball device of claim 1, wherein
said first, second and third supporting members support said sphere at three locations disposed equiangularly.

29. The input device of claim 13, wherein
said first, second and third supporting members support said sphere at three locations disposed equiangularly.

30. The vehicle of claim 16, wherein
said first, second and third supporting members support said sphere at three locations disposed equiangularly.

31. The trackball device of claim 1, wherein
said sphere comprises one of martensite stainless steel and ferrite stainless steel.

32. The trackball device of claim 1, wherein
said first, second and third supporting members are disposed below said sphere such that said sphere rests on said first, second and third supporting members.

33. The input device of claim 13, wherein
said first, second and third supporting members are disposed below said sphere such that said sphere rests on said first, second and third supporting members.

34. The vehicle of claim 16, wherein
said first, second and third supporting members are disposed below said sphere such that said sphere rests on said first, second and third supporting members.

* * * * *